United States Patent [19]

Momont et al.

[11] Patent Number: 5,150,666

[45] Date of Patent: Sep. 29, 1992

[54] FEEDING APPARATUS

[75] Inventors: Timothy W. Momont, Wolcottville; Charles R. Bird, Milford, both of Ind.

[73] Assignee: CTB, Inc., Milford, Ind.

[21] Appl. No.: 786,580

[22] Filed: Nov. 1, 1991

[51] Int. Cl.[5] .................... A01K 5/02; A01K 61/02
[52] U.S. Cl. ........................... 119/57.91; 119/51.04; 222/64; 222/394; 222/425; 222/637
[58] Field of Search ............... 119/57.91, 51.04, 56.2, 119/57.92; 221/174; 222/630, 637, 425, 424.5, 394, 564, 63, 64

[56] References Cited

U.S. PATENT DOCUMENTS

| | | | |
|---|---|---|---|
| 2,538,413 | 1/1951 | Chard | 119/57.91 |
| 3,477,407 | 11/1969 | Loudon | 119/51.04 |
| 3,526,210 | 9/1970 | Burton | 119/51.04 |
| 3,528,588 | 9/1970 | Moore | 119/51.04 |
| 3,934,038 | 1/1976 | Kerr | 119/51.04 |
| 3,990,402 | 11/1976 | Eriksson | 119/56.2 |
| 4,972,802 | 11/1990 | Huddleston et al. | 119/51.04 |

Primary Examiner—John G. Weiss
Attorney, Agent, or Firm—Trexler, Bushnell, Giangiorgi & Blackstone, Ltd.

[57] ABSTRACT

A feeding device comprises an element operable with a feed conveyor for dispersing food to an organism. The element comprises an upper chamber for receiving food and a lower chamber for dispersing food. The upper chamber is connected to the conveyor for receiving food therefrom. The upper chamber is also connected to the lower chamber so that food in the upper chamber can flow into the lower chamber. A valve is mounted for shifting between a filling position for allowing food to flow into the lower chamber, and a dispersing position for allowing dispersion of the food from the lower chamber while preventing food from flowing from the upper chamber to the lower chamber.

16 Claims, 2 Drawing Sheets

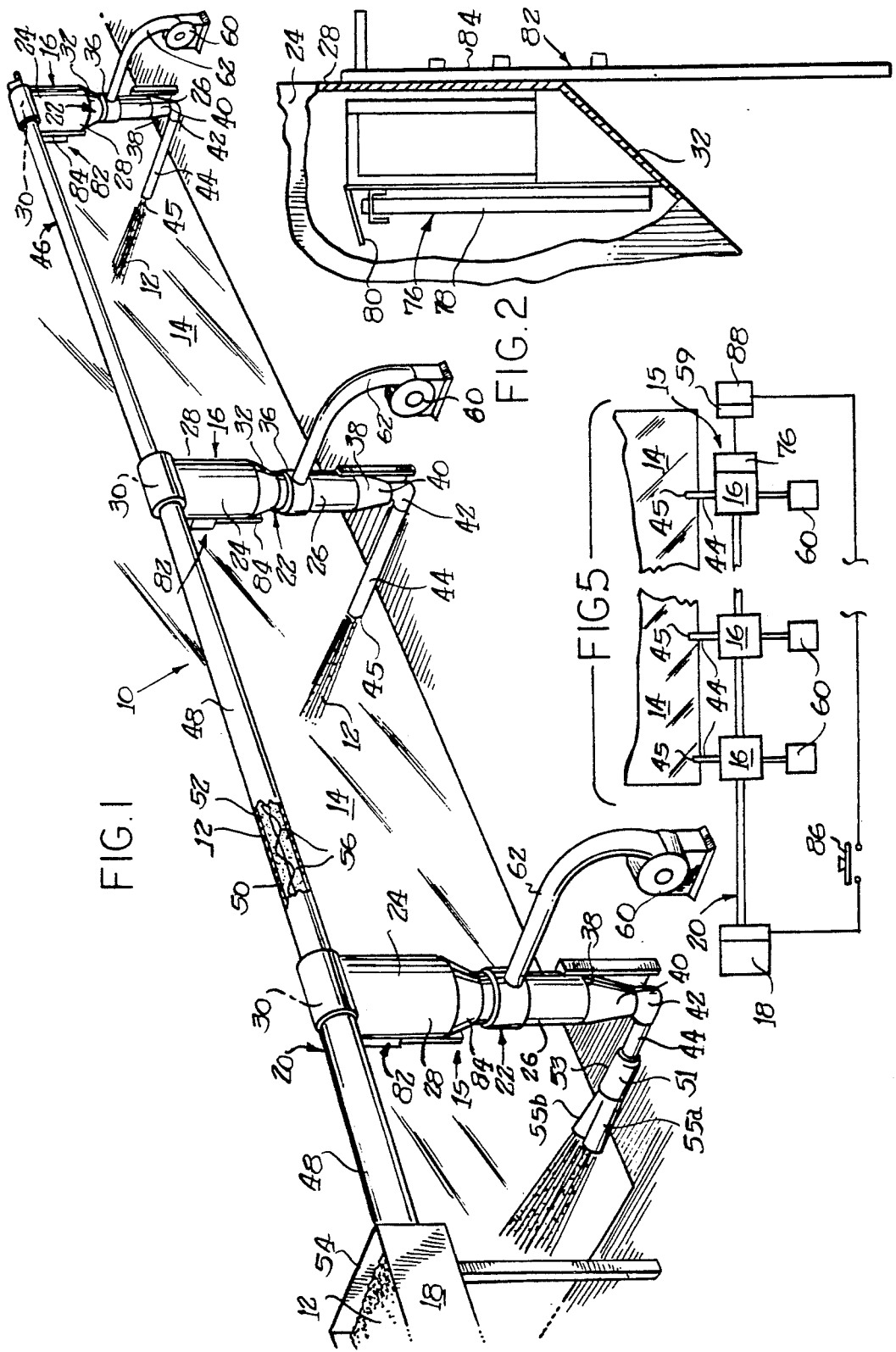

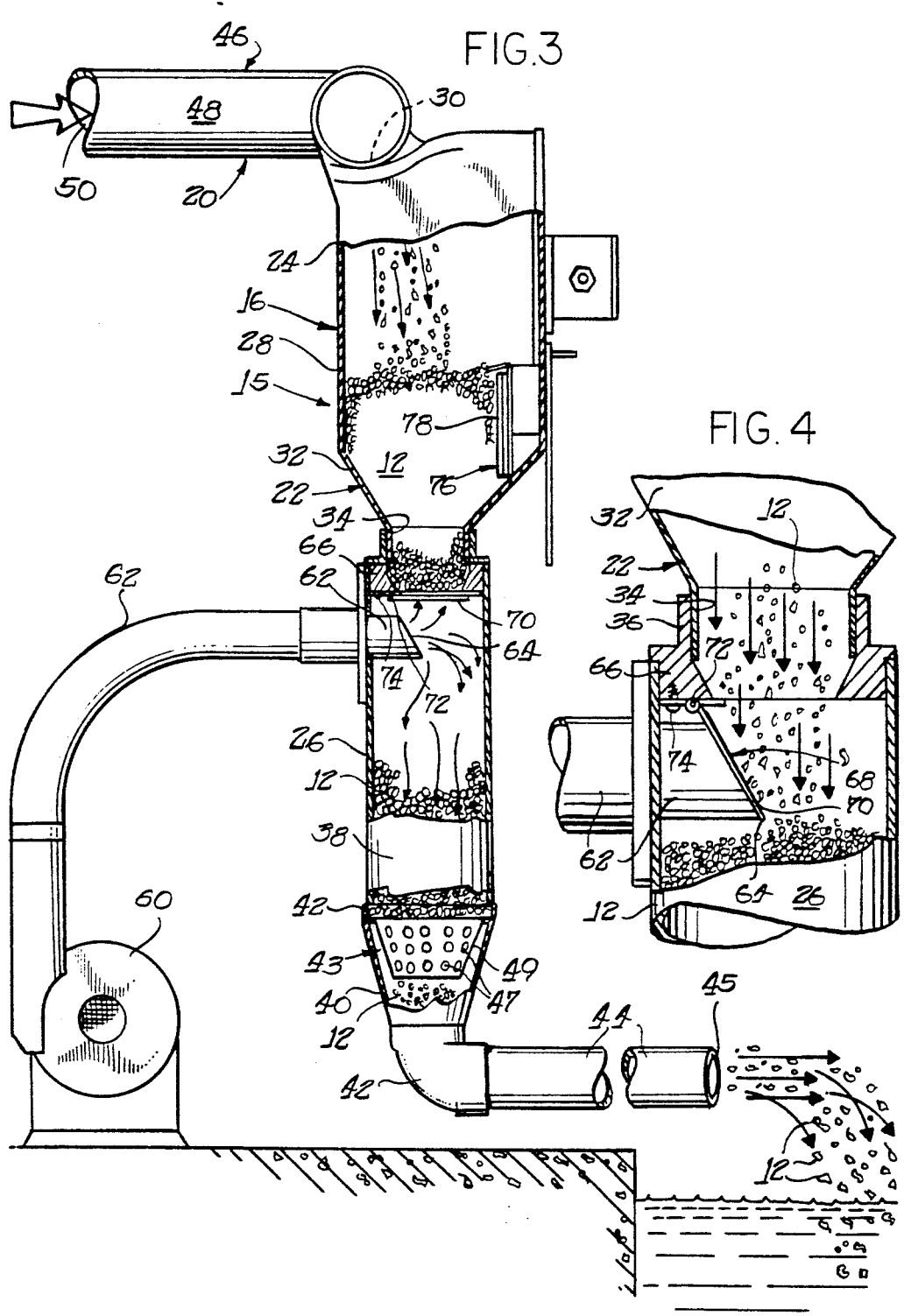

FEEDING APPARATUS

BACKGROUND AND SUMMARY OF THE INVENTION

The present invention relates generally to a new and efficient apparatus for dispersing food over an area in order to feed an organism.

The construction and particular functionality of feeding apparatuses is quite replete with variations, as is evident, for example, by the following U.S. Patents.

| Cupples | 2,243,896 | 06/03/41 |
| --- | --- | --- |
| Jarvis | 3,113,556 | 12/10/63 |
| Rack | 3,688,743 | 09/05/72 |
| Dils, Jr. et al. | 3,786,784 | 01/22/74 |
| Fillion | 4,027,627 | 06/07/77 |
| Goguel | 4,235,198 | 11/25/80 |
| Muller | 4,237,820 | 12/09/80 |
| Lowry, Jr. | 4,372,252 | 02/08/83 |
| Olson et al. | 4,429,660 | 02/07/84 |
| Wensman et al. | 4,492,182 | 01/08/85 |
| Sapp | 4,526,134 | 07/02/85 |

These apparatuses supply organisms, such as poultry, fish, and other livestock, with food automatically, at predetermined times and at predetermined rates. This leads to greater efficiency of the farm, and also results in reduced operating costs because a plurality of people do not have to be employed to feed the organisms. Use of the apparatus also sometimes leads to a more standardized product.

The present invention is intended to provide a novel and efficient feeding apparatus which is especially suitable for fish, and also with many other organisms.

OBJECTS AND SUMMARY OF THE INVENTION

A general object of the present invention is to provide a new and useful machine or apparatus for supplying organisms with food.

A more specific object of the invention is to provide a feeding system which can distribute food over a substantial area.

Another object of the present invention is to provide a feeding apparatus having a feed dispersion element which can self-actuate.

An additional object of the invention is to provide a feeding apparatus which can disperse food by means of gas propulsion.

A further object of the present invention is to provide a feeding apparatus which can transport food from a central location to a remote location.

Another object of the invention is to provide a feeding apparatus which is more efficient than other, currently available feeding systems.

An additional object of the present invention is to provide a feeding apparatus which can disperse a predetermined amount of food in a cycle.

A feeding apparatus, constructed according to the teachings of the present invention, for dispersing food over an area comprises feed conveyor means and feed dispersion means. The feed dispersion means has a feed inlet and a feed outlet. The feed conveyor means is connected to the feed inlet for filling the feed dispersion means with food. Expulsion means is connected with the feed dispersion means for forcibly expelling the food from the feed dispersion means. Valve means is disposed within the feed dispersion means shiftable between a filling position and a dispersing position. The filling position is defined by the valve means sealing the expulsion means from the feed dispersion means, and the dispersing position is defined by the valve means opening the expulsion means into the feed dispersion means.

BRIEF DESCRIPTION OF THE DRAWINGS

The organization and manner of the structure and operation of the invention, together with further objects and advantages thereof, may best be understood by reference to the following description taken in connection with the accompanying drawings, wherein like reference numerals identify like elements in which:

FIG. 1 is a perspective view of a feeding apparatus or system, constructed according to the teachings of the present invention, dispersing food into an area, such as a fish tank;

FIG. 2 is a magnified view of a portion of an end feed dispersion element of the feeding apparatus showing the control switch;

FIG. 3 is a partially sectioned view of the end feed dispersion element of FIG. 2, illustrating the function thereof with valve means in a dispersing position and with blowers and conveyor drive energized, dispersing food into the area and allowing food to fill an upper chamber;

FIG. 4 is an enlarged view of a portion of the end feed dispersion element of FIG. 3 illustrating the valve means in the filling position, allowing food to flow into the lower chamber; and FIG. 5 is a block schematic diagram of the feeding apparatus of the present invention.

DETAILED DESCRIPTION OF THE PREFERRED EMBODIMENT

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

Referring initially to FIG. 5, a feeding apparatus or system 10, constructed according to the teachings of the present invention, for dispersing food 12 over an area 14, such as a fish tank or other organism-occupied area is illustrated in block schematic form. The feeding apparatus 10 generally comprises feed dispersion means 15 in the form of a plurality of feed dispersion elements 16 connected in series to a feed bin 18 by feed conveyor means 20.

The construction of the elements 16 is illustrated in FIG. 1 and FIG. 3. Specifically, each of the elements 16 comprises a hollow body 22 having an upper chamber 24 and a lower chamber 26. The upper chamber 24 has a substantially cylindrical portion 28 which extends from a feed inlet 30 disposed on the top of the upper chamber 24 downwardly to a substantially conical portion 32.

The feed inlet 30 is connected with the feed conveyor means 20, and allows food 12 disposed within the means 20 to fall into the cylindrical portion 28 of the upper chamber 24. As the food 12 falls into the upper chamber 24, it flows downwardly to encounter the conical portion 32. The conical portion 32 acts as a funnel, directing the food 12 towards an upper chamber outlet 34.

The upper chamber outlet 34 is connected with an upper end 36 of the lower chamber 26 so that food 12 in the upper chamber 24 can fall into the lower chamber 26. The lower chamber 26 is substantially cylindrical, however, other shapes and configurations are also usable. A volume encompassed by the lower chamber 26 is slightly larger than a corresponding volume encompassed by the upper chamber 24. This is desirable so that the lower chamber 26 can accommodate all of the food 12 contained within the upper chamber 24.

A lower end 38 of the lower chamber 26 is connected to a substantially conically-shaped member 40, which is, in turn, connected at an end opposite to the lower end 38 to an elbow 42. The member 40 acts as a funnel directing the food 12 into the elbow 42.

A flow control device in the form of a deceleration funnel 43 is disposed within the member 40 above the elbow 42 so that food 12 incorporated in driven gas must encounter the funnel 43 before entering the elbow 42. The funnel 43 has a plurality of gas passage holes or perforations 47 in a conical side 49 of the funnel 43. The funnel 43, therefore, restricts the flow of food 12, but not the flow of driven gas to achieve an air to feed ratio ideal for expulsion by means of the feed dispersion elements 16. The funnel 43 thus controls the rate of food 12 expulsion, and insures a greater air to food 12 ratio than that when the funnel 43 is absent. The funnel 43 reduces tendencies for food 12 to jam or clog within the elements 16, thereby assuring continuous expulsion of food 12.

The elbow 42 defines a substantially ninety degree angle for changing the direction of food 12 flow from substantially vertical to substantially horizontal. The elbow 42 is connected, at an end thereof opposite to the conical member 40, to an exhaust tube 44, which terminates at a feed outlet 45 for allowing the food 12 to be discharged from the dispersion element 16. Thus, the exhaust tube 44 is oriented for directing food 12 into the area 14.

In a preferred embodiment of the apparatus 10, a manifold 51, illustrated in FIGS. 1 and 3, can be inserted in-line between the elbow 42 and the exhaust tube 44. The manifold 51 has a single inlet 53 and at least two outlets 55a and 55b. Separate exhaust tubes 44 are independently connected to each of the outlets 55a and 55b. Utilization of the manifold 51 allows a single dispersion element 16 to cover twice the area 14 as is covered when the manifold 51 is not used. Elements 16 having a manifold 51 can be mixed with elements not having a manifold along the same auger line 46. This allows the apparatus 10 to be specifically tailored to deliver food 12 to an area 14, as shown in FIG. 1.

The conveyor line 46 comprises a substantially cylindrical tube 48 having an axial bore 50 which extends the entire length of the tube 48. The bore 50 is sufficient to accept an auger 52 for carrying or transporting the food 12 from the feed bin 18 to the elements 16, as shown in FIG. 1. Specifically, the auger 52 has helical convolutions 56 throughout its entire length. The convolutions 56 substantially fill the diameter of the bore 50 so as to move the food 12 along the tube 48 upon rotation of the auger 52. The rotation of the auger 52 is controlled by an conveyor drive.

The bore 50 communicates with an interior 54 of the feed bin 18 so that the food 12 disposed within the interior 54 can enter the bore 50 and be caught up by the auger convolutions 56. The auger 52 extends the entire length of the tube 48, so that the entire tube 48 can be filled with food 12. The tube 48 has openings therein in alignment with the feed inlets 30 associated with the elements 16, whereby the food 12 within the tube 48 can fall into the upper chamber 24, as described above.

To facilitate food 12 dispersion by the elements 16, the feed dispersion means 15 includes expulsion means or a source of driven gas in the form of a blower 60 connected to each of the dispersion elements 16 by means of a tube 62. Thus, the food 12 is dispersed by means of gas propulsion. The blower 60 is of known construction, such as a fan, and the like, and preferably provides the elements 16 with driven air. In a preferred construction, each of the elements 16 is connected to its own associated blower 60, although this is not necessary.

The tube 62 extends from the blower 60 to the elements 16 so that the driven air can pass through the tube 62 from the blower 60 into the interior of the elements 16. Specifically, the tube 62 extends into the lower chamber 26 adjacent the upper end 36 thereof proximate to the juncture between the lower chamber 26 and the upper chamber outlet 34.

The tube 62 extends into the lower chamber 26 a certain distance, and terminates at a sloping end 64. The sloping end 64 is substantially planar, and defines an angle which slopes upwardly with respect to the lower end 38 of the lower chamber 26.

The substantially planar configuration of the sloping end 64 allows it to be effectively sealed by appropriate means. The lower chamber 26 includes a support body or cap 66 disposed proximate the juncture between the upper chamber outlet 34 and the upper end 36 of the lower chamber 26. The support body 66 is sufficient to support valve means 68 for sealing the sloping end 64 of the tube 62 and may be molded with the lower chamber 26 as one piece from a suitable material, such as plastic and the like, if desired.

The valve means 68 preferably comprises a flap 70 and a hinge 72 connected to the flap 70 so that the flap 70 is rotatable with respect to the hinge 72. The hinge 72 is fixedly mounted to the support body 66 by means of a fastener 74, such as a screw, as shown in FIG. 3 and FIG. 4. Thusly, the valve means 68 is shiftable between a filling position and a dispersing position. The filling position is defined by the flap 70 confronting and sealing the sloping end 64 of the tube 62. The flap 70 is maintained in the filling position by gravity. The dispersing position is defined by the flap 70 confronting and sealing the upper chamber outlet 34. The flap 70 is maintained in the dispersing position by interaction with the driven air, as will be discussed herein.

Regulating means in the form of a control switch 76 is variably disposed within the cylindrical portion 28 of the upper chamber 24 of a dispensing element 16, as shown in FIG. 2, disposed on an end of the conveyor line 46 opposite to the end connected to the feed bin 18. Thus, only one element 16 has the control switch 76. The control switch 76 is electrically connected to the conveyor drive 59. Thus, the control switch 76 controls the operation of the conveyor drive 59.

The control switch 76 is preferably of the pressure-activated type, having a pressure sensitive diaphragm 78. The diaphragm 78 is compressible against a switch element which opens the circuit, thereby turning off the conveyor drive 59. The diaphragm 78 is compressible by the presence of food 12 within the upper chamber 24. Thus, a specific amount of food 12 must be present in the upper chamber 24 in order for the conveyor drive 59 to be shut off. To prevent accidental compression of the diaphragm 78, a shield 80 is provided for deflecting food 12, thereby preventing the food 12 from striking the diaphragm 78 as it falls from the feed inlet 30.

The control switch 76 is connected physically to shifting means 82 in the form of a variable slide member 84 for adjusting the level at which the diaphragm 78 is located within the upper chamber 24. The slide member 84 extends from the switch 76 through the upper chamber 24 to its exterior to allow a workman to adjust the level of the diaphragm 78 from the exterior of the element 16.

The slide member 84 shifts the switch 76 axially within the upper chamber 24 so as to effectively change the amount of food 12 that must be present in the upper chamber 24 in order to compress the diaphragm 78. Specifically, if the switch 76 is shifted upwardly towards the feed inlet 30, then a greater amount of food 12 must be present in the upper chamber 24 to contact and compress the diaphragm 78 than would be required if the switch 76 were shifted downwardly towards the upper chamber outlet 34. The feeding apparatus 10 is also provided with a master switch 86 for supplying electrical power to the circuit.

With the structure of the feeding apparatus 10 thusly disclosed, the operation of the same will now be discussed. Food 12 is dumped into the feed bin 18 so that the auger 52 can contact the food 12. At this time, the conveyor line 46 and the elements 16 are devoid of food 12. The master switch 86 is thrown, thereby energizing the circuit. Because the diaphragm 78 is not compressed, the conveyor drive 59 and the blowers 60 operate. It is to be noted that the conveyor drive 59 and the blowers 60 both operate at the same time.

The conveyor drive 59 rotates the auger 52 so that food 12 will be moved along the conveyor line 46. As the food 12 moves along the bore 50 of the tube 48, some of the food 12 encounters the openings in the tube 48 and falls through the feed inlet 30 and into the upper chamber 24 of the elements 16.

Because the blowers 60 operate at the same time as the conveyor drive 59, the driven air flows from the blowers 60 through the tube 62 and into the lower chamber 26 of the elements 16. The driven air confronts and engages the flap 70 and shifts it into the dispersing position, thereby sealing the upper chamber outlet 34. Because the chamber outlet 34 is sealed, the food 12 falls into the upper chamber 24, and is directed towards the chamber outlet 34 by the conical portion 32, but is prevented from exiting the upper chamber 24.

As the operation of the conveyor drive 59 and the blowers 60 continues, more and more food 12 is deposited in each of the upper chambers 24 of the elements 16. This depositing process continues until an amount of food 12 sufficient to compress the diaphragm 78 is present within the upper chamber 24. This specific amount depends upon the positioning of the switch 76 within the upper portion 24. Thus, the positioning of the switch 76 allows a workman to specifically meter, to a certain extent, the amount of food 12 that will be dispersed in a given cycle by the feeding apparatus 10.

Further metering of the amount of food dispersed from each element 16 can be accomplished by utilizing a mechanically sliding baffle, not shown, with each element 16. The baffle may be of any suitable construction and may take on a number of different forms, such as the extensible and retractable bellows member disclosed in the patent to Kallin, U.S. Pat. No. 4,185,587; and the movable wall structure disclosed in the patent to Van Daele, U.S. Pat. No. 4,200,060. Both of those patents are assigned to the assignee of the present invention, and their disclosures are incorporated herein by reference. The metering of individual elements 16, which can be combined with utilization of manifolds 51, allows the feeding apparatus 10 to be tailored to meet the specific feeding requirements of a certain area 14 or a certain organism.

When sufficient food 12 is disposed within the upper chamber 24, the diaphragm 76 is compressed, thereby opening the circuit. When the circuit is open, the conveyor drive 59 is shut off. A timer 88 keeps the blowers 60 functioning after the conveyor drive 59 is shut off a period of time sufficient to insure that all of the food 12 has been expelled from the exhaust tube 44. The timer 88 is of the programmable type, and is adjustable to account for variances in different installations of the feeding apparatus 10.

Specifically, the timer 88, in a preferred construction, performs at least three separate functions. First, the timer 88 performs as a master time clock for determining a specific time period, or feeding window, during which the feeding apparatus 10 can operate. Second, the timer 88 acts as an intermittent or cycle timer for dividing the feeding window into a number of feeding cycles during which the apparatus 10 operates expelling food 12 into the area 14. When the timer 88 acts as the cycle timer, it starts the feeding cycle, activating the auger 52 and the blowers 60. Third, the timer 88 functions as a blower timer for determining how long the blowers 60 will operate during the feeding cycle. As stated above, when the diaphragm 76 is compressed by food 12, the conveyor drive 59 is shut off. In order to insure that all food 12 is removed from the exhaust tube 44, the timer 88, acting as a blower timer, keeps the blowers 60 functioning for a time slightly longer than the time needed to fill the upper chambers 24 of the elements 16. Because the timer 88 is programmable, the above-stated time periods may be set at any desired length, and changed if necessary.

Further illustrating by means of example, the timer 88, as the master time clock, may be programmed to define a feeding window of twenty four hours. The timer 88, as the cycle timer, can be set to define feeding cycles of one hour each. Thus, the feeding apparatus 10 will operate through one full cycle once every hour. When the cycle begins, the conveyor drive 59 is energized and operates until the diaphragm 76 is compressed. When the diaphragm 76 is compressed, the drive 59 is deactivated. The timer 88, as the blower timer, maintains operation of the blowers 60 for a certain, pre-determined time period, say one minute, after deactivation of the conveyor drive 59. After deactivation of the blowers 60 by the timer 88, the feeding apparatus 10 lies dormant until it is time to initiate the cycle again.

It is to be noted that this timed aspect of the feeding apparatus 10 provides distinct advantages over prior art feeders. Specifically, if a certain organism requires 240 pounds of food per day, the prior art devices dispersed that food all at once, leaving the organism to eat it over the duration of the day. Often, the organism could not consume all of that food when dispersed. Thus, some of the food would lie in the area for a significant time period, producing an unsanitary condition unhealthy to the organism. The feeding apparatus 10 avoids that problem by dispersing, for example, ten pounds of food into the area 14 each hour throughout the day. Because the organism could consume this amount easily each hour, the area 14 would remain clean and healthy for the organism.

When the blowers 60 are shut off, driven air no longer maintains the flap 70 in the dispersing position. Gravity acts upon the flap 70 and pulls it away from the chamber outlet 34 and forces it against the sloping end 64. Additionally, the weight of the food 12 assists in shifting the flap 70 from the dispersing position and into the filling position.

The sloping end 64 of the tube 62 is sealed, and the food 12 falls into the lower chamber 26. Food 12 disposed in the upper chamber 24 is guided into the lower chamber 26 through the chamber outlet 34 by the conical portion 32. Accordingly, all of the food 12 that was in the upper chamber 24 is now disposed in the lower chamber 26, the member 40, the elbow 42, the funnel 43, and the exhaust tube 44, as shown in FIG. 4.

Because the diaphragm 78 is no longer compressed, the switch 76 closes the circuit again. When it is time for the next feeding cycle, as determined by the timer 88, the conveyor drive 59 and the blowers 60 are energized, and begin driving air through the tubes 62 and into the lower chamber 26. The driven air engages the flap 70, shifting it out of the filling position and into the dispersing position. Accordingly, the sloping end 64 is opened, and the chamber outlet 34 is sealed, as shown in FIG. 3. The driven air becomes involved with the food 12, and forces the food 12 out of the lower chamber 26, the member 40, the elbow 42, the funnel 43, and the exhaust tube 44 into the area 14, where it can be consumed.

Simultaneously, the conveyor drive 59 is energized, and begins to rotate the auger 52 again. The above described cyclical process continues again and again, as determined by the programmed timer 88, until the master switch 86 is thrown to disable the delivery circuit. If desired, the master switch 86 may be controlled and turned on and off by a timer, not shown, in a known manner. Thus, the feeding apparatus 10 represents a novel and efficient means for dispersing food 12 into an area 14 for consumption by fish or another organism.

While a preferred embodiment of the present invention is shown and described, it is envisioned that those skilled in the art may devise various modifications of the present invention without departing from the spirit and scope of the appended claims. The invention is not intended to be limited by the foregoing disclosure, but only by the following appended claims.

The invention claimed is:

1. A feeding apparatus for dispersing food to an organism comprising: feed conveyor means and feed dispersion means; the feed dispersion means having a feed inlet, a feed outlet, an upper chamber and a lower chamber; the feed inlet being connected to the upper chamber, and the feed outlet being connected to the lower chamber; the feed conveyor means being connected to the feed inlet for filling the upper chamber with food; expulsion means connected with the lower chamber for supplying a driven fluid to the feed dispersion means for forcibly expelling food therefrom; valve means disposed within the feed dispersion means shiftable between a filling position and a dispersing position; and the filling position being defined by the valve means allowing food to flow from the upper chamber into the lower chamber, and the dispersing position being defined by the valve means allowing dispersion of the food from the lower chamber while preventing food from flowing from the upper chamber to the lower chamber.

2. A feeding apparatus as defined in claim 1 wherein the feed conveyor means comprises a tube; an auger located within the tube for moving food along the tube; and the tube operatively connected to the feed inlet for filling the feed dispersion means with food.

3. A feeding apparatus as defined in claim 1 wherein the expulsion means comprises a blower for providing a driven gas to the feed dispersion means.

4. A feeding apparatus as defined in claim 1 wherein the valve means comprises a shiftable flap.

5. A feeding apparatus as defined in claim 1 further comprising a control switch disposed within the feed dispersion means; the control switch being electrically connected to the feed conveyor means; and the control switch being responsive to an amount of food disposed within the feed dispersion means for deactivating the feed conveyor means.

6. A feeding apparatus as defined in claim 5 wherein the control switch has a compressible diaphragm.

7. A feeding apparatus as defined in claim 5 wherein shifting means is connected to the control switch for variably shifting the control switch into different dispositions within the feed dispersion means.

8. A feeding apparatus as defined in claim 6 further comprising a shield disposed on the control switch for preventing accidental compression of the diaphragm.

9. A feeding apparatus as defined in claim 1 wherein wherein the feed dispersion means comprises elements having an upper chamber and a lower chamber; a chamber outlet disposed on the upper chamber; the upper chamber being connected to the lower chamber at the chamber outlet; the expulsion means being connected to the feed dispersion means below the chamber outlet; the valve means being connected to the feed dispersion means between the chamber outlet and the expulsion means; and the valve means sealing the chamber outlet in the dispersing position, and sealing the expulsion means from the feed dispersion means in the filling position.

10. A feeding apparatus as defined in claim 3 wherein the blower is connected to the feed dispersion means by a tube; the tube having a sloping end; and the valve means sealing the tube at the sloping end in the filling position.

11. A feeding element operable with feed conveyor means for dispersing food to an organism comprising: an upper chamber for receiving food and a lower chamber for dispersing food; the upper chamber connected to the lower chamber so that food in the upper chamber can flow into the lower chamber; a valve mounted for shifting between a filling position for allowing food to flow into the lower chamber, and a dispersing position for allowing dispersion of food from the lower chamber while preventing food from flowing from the upper chamber to the lower chamber; and expulsion means operatively connected to the lower chamber and connectable to a source of driven fluid for directing driven fluid into the lower chamber for expelling food therefrom.

12. A feeding element as defined in claim 11 wherein the valve comprises a shiftable flap.

13. A feeding element as defined in claim 11 wherein the expulsion means comprises a blower for providing a driven gas to the element.

14. A feeding element as defined in claim 13 wherein the expulsion means is connected to the element proximate to the valve means; and the valve means sealing the expulsion means from the element when the valve means is in the filling position.

15. A feeding element as defined in claim 11 further comprising a blower connected with the lower chamber for shifting the valve from the filling position to the dispersing position and simultaneously expelling food from the lower chamber.

16. A feeding element as defined in claim 11 further comprising a manifold connected to the lower chamber for increasing an area to which food is dispersed.

* * * * *